(12) United States Patent
Emrich et al.

(10) Patent No.: US 10,688,895 B2
(45) Date of Patent: Jun. 23, 2020

(54) LONGITUDINAL ADJUSTER AND VEHICLE SEAT

(71) Applicant: Adient Engineering and IP GmbH, Burscheid (DE)

(72) Inventors: Holger Emrich, Erdesbach (DE); Ute Jeblick, Hochspeyer (DE); Michael Koenig, Rodenbach (DE); Martin Reischmann, Hoehfroeschen (DE); Ralf Velten, Heltersberg (DE)

(73) Assignee: Adient Engineering and IP GmbH, Burscheid (DE)

( * ) Notice: Subject to any disclaimer, the term of this patent is extended or adjusted under 35 U.S.C. 154(b) by 0 days.

(21) Appl. No.: 16/364,712

(22) Filed: Mar. 26, 2019

(65) Prior Publication Data

US 2019/0299825 A1 Oct. 3, 2019

(30) Foreign Application Priority Data

Mar. 27, 2018 (DE) .................... 10 2018 107 237
Jun. 6, 2018 (DE) .................... 10 2018 113 177

(51) Int. Cl.
*F16M 13/00* (2006.01)
*B60N 2/42* (2006.01)
*B60N 2/08* (2006.01)

(52) U.S. Cl.
CPC ............ *B60N 2/43* (2013.01); *B60N 2/0875* (2013.01); *B60N 2/0881* (2013.01); *B60N 2/4214* (2013.01)

(58) Field of Classification Search
CPC ...... B60N 2/43; B60N 2/0881; B60N 2/4214; B60N 2/0875

USPC ......... 248/429, 424; 296/65.11, 65.12, 65.13
See application file for complete search history.

(56) References Cited

U.S. PATENT DOCUMENTS

| 7,789,368 B2 * | 9/2010 | Yamada | B60N 2/0705 248/419 |
| 2013/0264453 A1 | 10/2013 | Dill et al. | |
| 2013/0264454 A1 * | 10/2013 | Hayashi | B60N 2/08 248/429 |
| 2018/0229626 A1 * | 8/2018 | Sprenger | B60N 2/0881 |

FOREIGN PATENT DOCUMENTS

| DE | 36 36 545 A1 | 4/1987 |
| DE | 100 50 957 A1 | 5/2002 |
| DE | 100 46 204 A1 | 6/2002 |
| DE | 10201092 | 7/2003 |

(Continued)

*Primary Examiner* — Todd M Epps
(74) *Attorney, Agent, or Firm* — Marshall & Melhorn, LLC (57) ABSTRACT

A longitudinal adjuster (10) for a vehicle seat (1), including at least one rail pair which is formed from a first seat rail (12) and a second seat rail (14), the seat rails (12, 14) of the rail pair encompassing one another and being movable relative to one another in the longitudinal direction (x) and being able to be locked to one another via a locking device (16), the locking device (16) having at least one locking element, in particular at least one latching plate (18) which is movable in the vertical direction (z), the longitudinal adjuster (10) having an additional locking means (30) which is normally inoperative and is actuated only in the event of a crash by mass inertia. A vehicle seat (1), in particular a motor vehicle seat, includes a seat part (2) and a longitudinal adjuster (10).

18 Claims, 5 Drawing Sheets

(56) References Cited

FOREIGN PATENT DOCUMENTS

| | | |
|---|---|---|
| DE | 10 2010 049 542 A1 | 4/2012 |
| DE | 10 2014 219 868 A1 | 3/2016 |
| EP | 0245650 A2 | 11/1987 |

* cited by examiner

LONGITUDINAL ADJUSTER AND VEHICLE SEAT

CROSS REFERENCE TO RELATED APPLICATIONS

This application claims the benefit of priority under 35 U.S.C. § 119 of German Application DE 10 2018 107 237.6, filed Mar. 27, 2018, and German Application DE 10 2018 113 177.1, filed Jun. 6, 2018, the entire contents of which are incorporated herein by reference.

FIELD OF THE INVENTION

The invention relates to a longitudinal adjuster for a vehicle seat, comprising at least one rail pair which is formed from a first seat rail and a second seat rail, the seat rails of the rail pair encompassing one another and being movable relative to one another in the longitudinal direction and being able to be locked to one another by means of a locking device, the locking device having at least one locking element, in particular at least one latching plate which is movable in the vertical direction. The invention further relates to a vehicle seat.

BACKGROUND OF THE INVENTION

A typical longitudinal seat adjuster is designed in such a way that said adjuster withstands the normal loads directed in the longitudinal direction which are produced during normal use by an occupant of the vehicle seat. However, in the event of a pile-up, in the case of what is known as a crash, much higher forces act on the longitudinal seat adjuster.

A vehicle seat or a locking device for a longitudinal adjuster for a vehicle seat is known from DE 100 50 957 A1. For longitudinal adjustment, the vehicle seat comprises a seat rail pair consisting of an upper rail and a lower rail, through the two walls of which the teeth of a locking element reach on each side of said locking element.

The longitudinal adjustment devices of vehicle seats must be dimensioned in such a way that, in the event of a crash, the seat rail pairs do not tear open, and the locking means do not open. Otherwise the vehicle seat detaches from the vehicle structure in the event of a crash and is accelerated. Sudden braking can cause injuries to the seat user.

DE 35 36 545 A1 therefore proposes providing an additional locking means comprising a crash-sensitive inertia pendulum as a trigger.

It is known from DE 100 46 204 A1 to provide bolt elements which are normally inoperative and, only in the event of a crash, interact to form a non-positive connection and/or positive connection in order to additionally lock an upper rail and a lower rail using the additional locking means.

SUMMARY OF THE INVENTION

The problem addressed by the invention is that of improving a longitudinal adjuster of the type mentioned at the outset, in particular increasing the load absorbency in the event of a crash and providing a corresponding vehicle seat.

This problem is solved according to the invention by a longitudinal adjuster for a vehicle seat, comprising at least one rail pair which is formed from a first seat rail and a second seat rail, the seat rails of the rail pair encompassing one another and being movable relative to one another in the longitudinal direction and being able to be locked to one another by means of a locking device, the locking device having at least one locking element, in particular at least one latching plate which is movable in the vertical direction, wherein the longitudinal adjuster has an additional locking means which is normally inoperative and is actuated only in the event of a crash by mass inertia.

As a result of the fact that the longitudinal adjuster has an additional locking means which is normally inoperative and is actuated only in the event of a crash by mass inertia, a load of the longitudinal adjuster, in particular of the locking device, which is increased in the event of a crash can be withstood without parts of the locking device being damaged, or the function thereof being impaired, as a result.

The advantageous embodiments described in the following can be used individually or in combination with one another.

The additional locking means can be designed to be operative both in the event of a front impact and in the event of a rear impact. The additional locking means can be designed to be independent of the locking device. The additional locking means can be reversible.

The additional locking means can have a housing. The housing can have a substantially rectangular cross section. The housing can have a cross section which is substantially adapted in some portions to an inner face of the first seat rail.

The housing can have a recess. The housing can have a mounting opening. The housing preferably has at least one through-opening. The at least one through-opening can be designed to be round. The at least one through-opening can have an edge contour which has in particular a conical or dome-shaped path which opens toward an inner face of the housing.

The additional locking means can have a pivot lever. The pivot lever can have a mounting portion. The pivot lever can be pivotally mounted by means of the mounting portion in a mounting opening in the housing. The pivot lever can have a contour. The contour preferably has a curved path. At an end of the pivot lever which is opposite the mounting portion, a latching element is preferably held. The contour is preferably arranged in a central portion of the pivot lever, in particular in a region between the mounting portion and the latching element. The contour of the pivot lever is preferably arranged in the region of the at least one through-opening in the housing.

The latching element can be designed in the form of an additional latching plate. The latching element can have at least two projections in each case on the two opposite sides thereof. The latching element can be attached to the pivot lever. The latching element is preferably welded, riveted or screwed to the pivot lever. The latching element can be bonded to the pivot lever.

The additional locking means can have a sphere. The sphere can be made of metal. The sphere can be arranged in the housing so as to be freely movable. The sphere can be arranged in the region of the through-openings. Normally, the sphere can enter in part a through-opening in the housing which is arranged at the bottom in the vertical direction. The contour of the pivot lever is normally preferably arranged above the position of the sphere in the vertical direction.

The first seat rail can have at least one additional opening which preferably has the same design as the openings in the locking device. The additional locking means is preferably arranged directly in front of or behind the locking device in the longitudinal direction of the first seat rail.

The problem is further solved according to the invention by a vehicle seat, in particular a motor vehicle seat, comprising a seat part and a longitudinal adjuster according to the preceding description.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
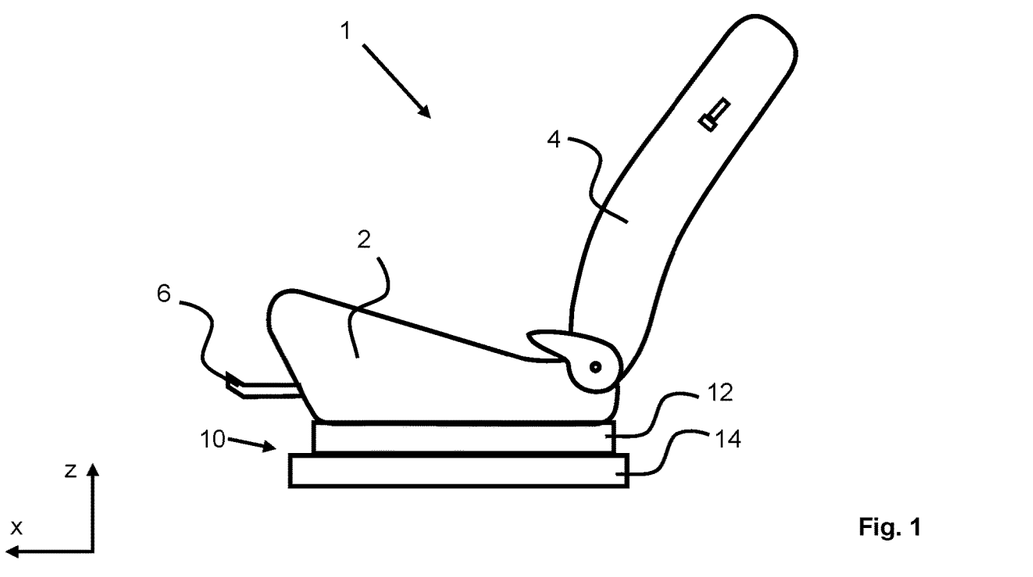
FIG. 1 is a schematic view of a vehicle seat.

The vehicle seat 1 shown schematically in FIG. 1 will be described in the following using three spatial directions extending perpendicularly to one another. In the case of a vehicle seat 1 installed in the vehicle, a longitudinal direction x extends predominantly horizontally and preferably parallel to a vehicle longitudinal direction which corresponds to the usual driving direction of the vehicle. A transverse direction y extending perpendicularly to the longitudinal direction x is likewise oriented horizontally in the vehicle and extends parallel to a vehicle transverse direction. A vertical direction z extends perpendicularly to the longitudinal direction x and perpendicularly to the transverse direction y. In the case of a vehicle seat 1 installed in the vehicle, the vertical direction z extends parallel to the vehicle vertical axis.

The position and direction indications used, such as front, rear, top and bottom, relate to a viewing direction of an occupant sitting in the vehicle seat 1 in the normal seat position, the vehicle seat 1 being installed in the vehicle in a use position which is suitable for passenger transport, with an upright seat backrest 4 and oriented in the driving direction as is conventional. However, the vehicle seat 1 according to the invention can also be installed in a different orientation, for example transversely to the driving direction.

The vehicle seat 1 for a motor vehicle comprises a seat part 2 and a backrest 4, the inclination of which can be adjusted relative to the seat part 2. The longitudinal seat position of the vehicle seat 1 can further be adjusted by means of a longitudinal adjuster 10. The longitudinal adjuster 10 preferably has two rail pairs which are each formed from a first seat rail 12 and a second seat rail 14. The seat rails 12, 14 encompass one another and are displaceable relative to one another. The first seat rails 12 of the longitudinal adjuster 10 can preferably be connected to a seat structure, in particular a supporting structure of the seat cushion 2. Furthermore, the two seat rails 14 of the longitudinal adjuster 10 can preferably be connected to the vehicle structure. To adjust a longitudinal seat position, the longitudinal adjuster 10, in particular in each case a rail pair of the longitudinal adjuster 10, can be locked by means of a locking device 16.

To manually unlock the longitudinal adjuster 10 and to adjust a longitudinal seat position of the vehicle seat 1, the respective locking device 16 of the two rail pairs of the longitudinal adjuster 10 can be actuated by means of an operating lever 6. For the simultaneous actuation of the two locking devices 16 of the rail pairs, in this case, the operating lever 6 can act for example on a transmission rod arranged between the two locking devices 16.

Figure 2:
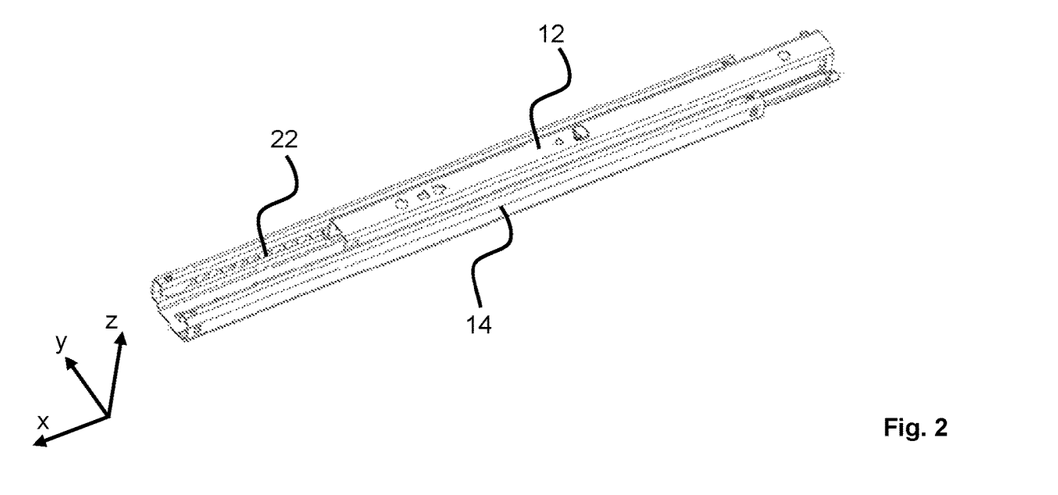
FIG. 2 is a perspective view of a rail pair of a longitudinal adjuster according to the invention.

FIG. 2 shows a rail pair of the longitudinal adjuster 10. The rail pair is formed from a first seat rail 12 and a second seat rail 14. In a cavity formed between the first seat rail 12 and the second seat rail 14 a locking device 16 is arranged. The second seat rail 14 comprises, in the region of the outer portions thereof which are parallel to the transverse direction y, a toothing 22 extending in the longitudinal direction x.

Figure 3:
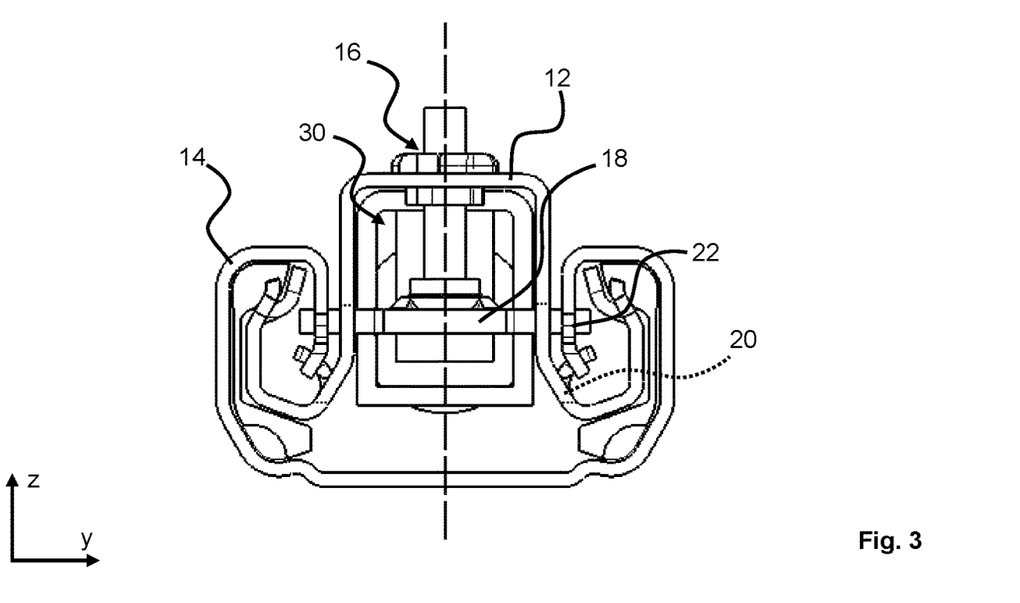
FIG. 3 is a cross-sectional view of the longitudinal adjuster according to the invention.

FIG. 3 is a cross-sectional view of the longitudinal adjuster 10 according to the invention. The locking device 16 has at least one locking element, in the present case a latching plate 18 which is movable in the vertical direction z. The latching plate 18 has laterally protruding projections which are guided into slot-type openings 20 in the first seat rail 12. The projections of the latching plate 18 project through the openings 20 in the first seat rail 12 and, in a locked position, project into the toothing 22 of the second seat rail 14. By displacing the latching plate 18 downward in the vertical direction z, the projections of the latching plate 18 can be disengaged from the toothing 22.

The additional locking means 30 has a housing 32. In the present case, the housing 32 has a substantially rectangular cross section. The cross section of the housing 32 is substantially adapted in some portions to an inner face of the first seat rail 12.

Figure 4:
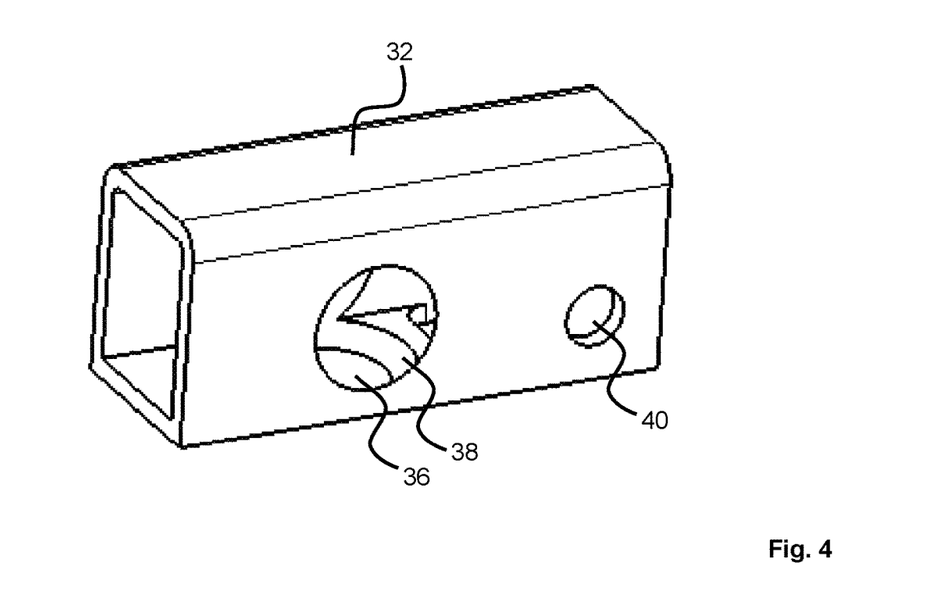
FIG. 4 is a perspective view of the housing of the additional locking means.
Figure 5:
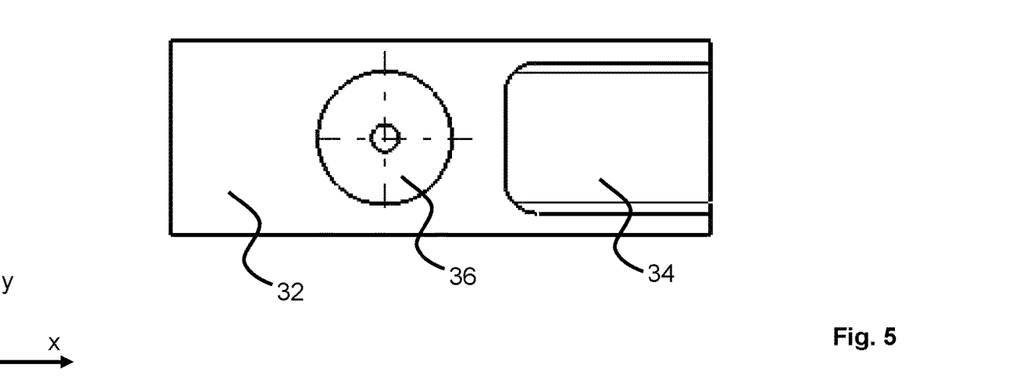
FIG. 5 is a view from below of a housing of the additional locking means.
Figure 6:
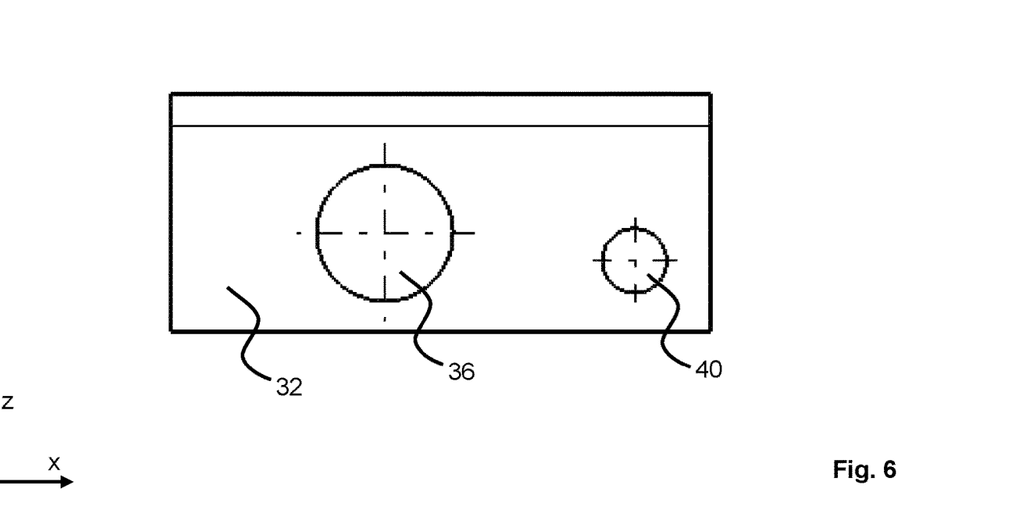
FIG. 6 is a side view of the housing of the additional locking means.

FIGS. 4, 5 and 6 show a housing 32 of the additional locking means 30 from different viewing angles but will be described together in the following. The housing 32 has a recess 34. The housing 32 has a mounting opening 40. The housing 32 has at least one through-opening 36. In the present case, three through-openings 36 are provided, one in each of the lateral faces which are opposite one another in the transverse direction y and one at the bottom in the vertical direction z. The three through-openings 36 in the present case are preferably designed to be round. The through-openings 36 each have an edge contour 38 which has in particular a conical or dome-shaped path which opens toward an inner face of the housing 32 in each case.

Figure 7:
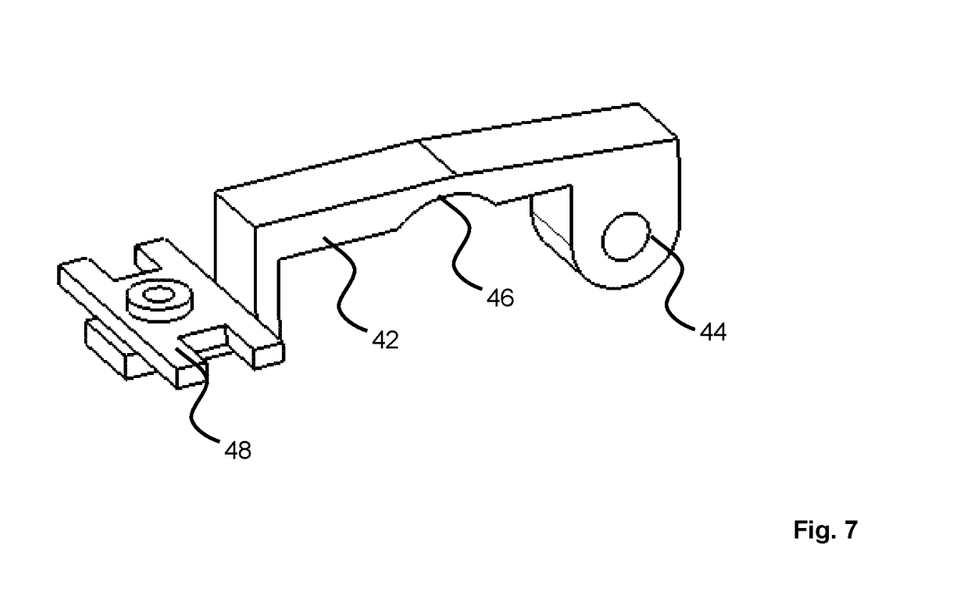
FIG. 7 is a perspective view of a pivot lever of the additional locking means.

FIG. 7 is a perspective view of a pivot lever 42 of the additional locking means 30. The additional locking means 30 has a pivot lever 42. The pivot lever 42 comprises a mounting portion 44. The pivot lever 42 can be pivotally mounted by means of the mounting portion 44 in the mounting opening 40 in the housing 32. The pivot lever 42 can be mounted in particular in connection with a mounting pin (not shown). The pivot lever 42 has a contour 46. The contour 46 preferably has a curved path. At an end of the pivot lever 42 which is opposite the mounting portion 44, a latching element 48 is preferably held. The contour 46 is preferably arranged in a central portion of the pivot lever 42, in particular in a region between the mounting portion 44 and the latching element 48. When the additional locking means 30 is mounted, the contour 46 of the pivot lever 42 is preferably arranged in the region of the at least one through-opening 36 in the housing 32.

In the present case, the latching element 48 is designed in the form of an additional latching plate. The latching element 48 has, on the two opposite sides thereof, in each case two projections which have the same design as the projections of the latching plate 18 of the locking device 16. The latching element 48 is attached to the pivot lever 42. The latching element 48 is preferably welded or riveted or screwed or bonded to the pivot lever 42.

Figure 8:
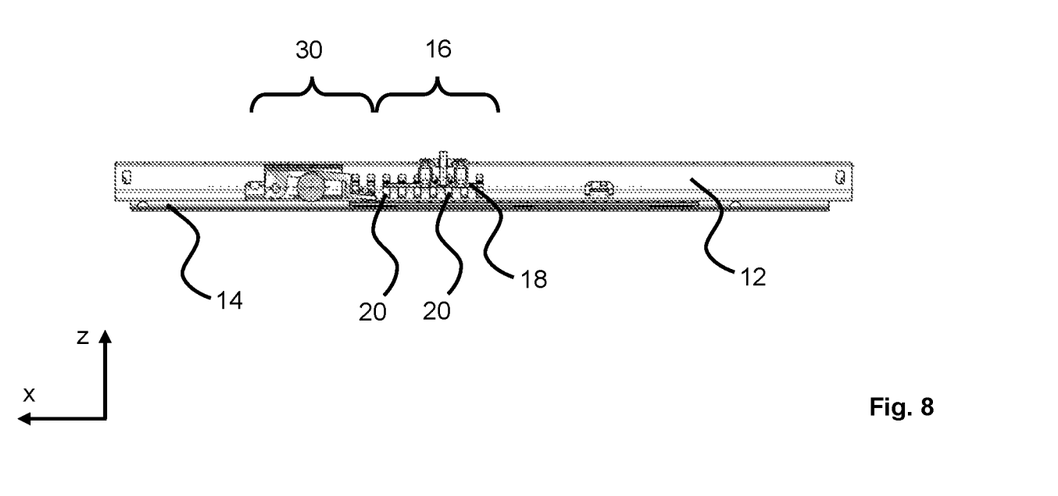
FIG. 8 is a longitudinal sectional view of the longitudinal adjuster.

FIG. 8 is a longitudinal sectional view of the longitudinal adjuster 10. In the present case, the additional locking means 30 is arranged in front of the locking device 16, but can also be arranged behind the locking device 16, in the longitudinal direction x.

For mounting and guiding the latching element 48, the first seat rail 12 has at least one additional opening 50 which preferably has the same design as the openings 20 of the locking device 16.

A construction and a function of devices for actuating the locking device 16, in particular for moving the latching plate 18 into an unlocking position or a locking position, are fundamentally known. In this respect, reference is made by way of example to DE 10 2010 049 542 A1 and corresponding U.S. patent publication, US 2013/0264453 A1, and to DE 10 2014 219 868 A1 and corresponding U.S. patent publication, US 2018/0229626 A1, the entire contents of each reference are hereby incorporated by reference.

The additional locking means 30 has a sphere 52. The sphere 52 is preferably made of a metal. The sphere 52 is arranged in the housing 32, preferably in the region of the through-openings 36, so as to be freely movable. The through-openings 36 have an inside diameter which is smaller than the outside diameter of the sphere 52. Normally, the sphere 52 is sunken in part in the through-opening 36 in the housing 32 which is arranged at the bottom in the vertical direction z. As shown, the contour 46 of the pivot lever 42 is normally preferably arranged above the position of the sphere 52 in the vertical direction z. In this case, normally, that is to say when the additional locking means 30 is not locked, the pivot lever 42 is pivoted until said pivot lever 42 rests either on the top of the sphere 52, or the latching element 48 rests on a lower edge of the additional opening 50. As a result of the pivot lever 42 resting on the sphere 52, said sphere can be held in the lower through-opening 36.

Figure 9:
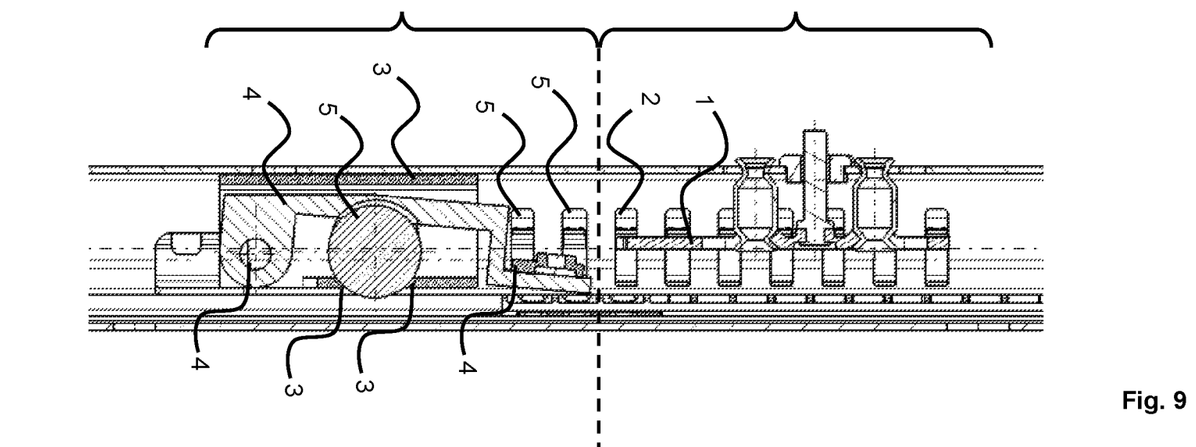
FIG. 9 is an enlarged detail from FIG. 8 with an unlocked additional locking means.

FIG. 9 shows an enlarged view of a detail of the additional locking means 30 from FIG. 8 in a normal state. In the present case, the additional locking means 30 is unlocked. The latching element 48 rests on an edge of the additional opening 50 which is at the bottom in the vertical direction z and is not engaged with the toothing 22 of the second seat rail 14. The locking device 16 is in a locked state, in which the latching plate 18 is moved upward in the vertical direction z and is engaged with the toothing 22 of the second seat rail 14. The additional locking means 30 is designed to be independent of the locking device 16.

Figure 10:
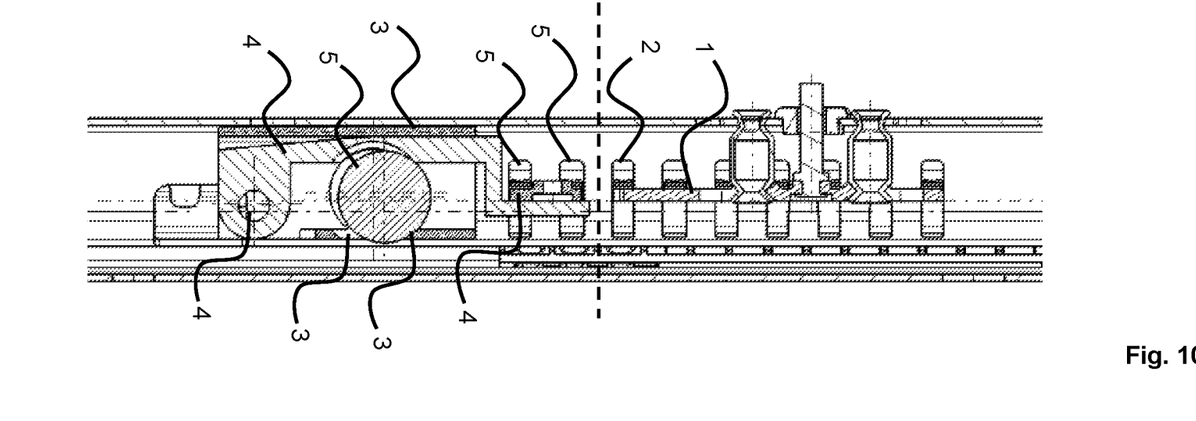
FIG. 10 is an enlarged detail from FIG. 8 with a locked additional locking means.

FIG. 10 shows an enlarged view of a detail of the additional locking means 30 from FIG. 8 in a locked state, for example after a crash. The additional locking means 30 can be operative both in the event of a front impact and in the event of a rear impact.

In the shown state during a rear impact, additional kinetic energy has suddenly been transmitted to the vehicle with the longitudinal adjuster 10, and therefore the motion speed with which said vehicle is moving forward has increased. If this motion speed increases suddenly, the sphere 52 which is freely movable in the housing 32 tries to maintain the original speed thereof as a result of the mass inertia thereof. Due to the resulting relative movement between the sphere 52 and the housing 32 of the additional locking means 30, the sphere 52 bumps against the portion of the edge contour 38 of the through-opening 36 which is at the rear in the longitudinal direction x and is deflected upward in part in the vertical direction z. In this case, the sphere 52 comes into contact with the contour 46 of the pivot lever 42 and pivots the pivot lever 42 upward about the mounting portion 44. In this case, the pivot lever 44 is pivoted upward until the upper edge of said lever comes to bear against the housing 32, or until the latching element 48 comes into maximum engagement with the toothing 22. As shown in FIG. 10 according to the shown locked state of the additional locking means 30, in the locked position, the latching element 48 is at the same level as the latching plate 18 in the locked position.

Analogously, by contrast, in the event of a front impact, a sudden reduction in the speed with which the vehicle with the longitudinal adjuster 10 is moving forward takes place. If this motion speed decreases suddenly, the sphere 52 which is freely movable in the housing 32 tries to maintain the speed thereof as a result of the mass inertia thereof. In this case, the sphere 52 would bump against a portion of the edge contour 38 of the through-opening 36 which is at the front in the longitudinal direction x and be deflected upward in part in the vertical direction z. In this case, the sphere 52 would also come into contact with the contour 46 of the pivot lever 42 and pivot the pivot lever 42 upward about the mounting portion 44. In this case, the pivot lever 44 is pivoted upward until the upper edge of said lever comes to bear against the housing 32, or until the latching element 48 comes into maximum engagement with the toothing 22.

The features disclosed in the preceding description, the claims and the drawings can be important both individually and in combination for implementing the invention in the various embodiments thereof.

While specific embodiments of the invention have been shown and described in detail to illustrate the application of the principles of the invention, it will be understood that the invention may be embodied otherwise without departing from such principles.

LIST OF REFERENCE SIGNS 1 vehicle seat
2 seat part
4 backrest
6 operating lever
10 longitudinal adjuster
12 first seat rail
14 second seat rail
16 locking device
18 latching plate
20 openings
22 toothing
30 additional locking means
32 housing
34 recess 36 through-opening
38 edge contour
40 mounting opening
42 pivot lever
44 mounting portion
46 contour
48 latching element
50 additional opening
52 sphere
x longitudinal direction
y transverse direction
z vertical direction

What is claimed is:

1. A longitudinal adjuster for a vehicle seat, the longitudinal adjuster comprising:
   at least one rail pair comprising a first seat rail and a second seat rail, the first seat rail and the second seat rail encompassing one another and being movable relative to one another in a longitudinal direction and the first seat rail and the second seat rail being configured to be locked to one another via a locking device, the locking device having at least one locking element comprising at least one latching plate movable in a vertical direction;
   an additional locking means inoperative in a normal state and actuated only in an event of a crash by mass inertia.

2. A longitudinal adjuster according to claim 1, wherein the additional locking means is configured to be operative both in event of a front impact and a rear impact.

3. A longitudinal adjuster according to claim 1, wherein the additional locking means is configured to be independent of the locking device.

4. A longitudinal adjuster according to claim 1, wherein the additional locking means is reversible.

5. A longitudinal adjuster according to claim 1, wherein the additional locking means comprises a housing having a cross section which is substantially adapted in some portions to an inner face of the first seat rail.

6. A longitudinal adjuster according to claim 5, wherein the housing comprises at least one through-opening, wherein the at least one through-opening is defined by an edge contour of the housing having a conical or dome-shaped path which opens toward an inner face of the housing.

7. A longitudinal adjuster according to claim 5, wherein the additional locking means comprises a pivot lever pivotally mounted via a mounting portion in a mounting opening in the housing.

8. A longitudinal adjuster according to claim 7, wherein an additional latching element is held at an end of the pivot lever, the end of the pivot lever being opposite the mounting portion.

9. A longitudinal adjuster according to claim 1, wherein the additional locking means comprises a sphere arranged in the housing such that the sphere is freely movable in the housing.

10. A vehicle seat, comprising
    a seat part; and
    a longitudinal adjuster comprising:
      at least one rail pair comprising a first seat rail and a second seat rail, the first seat rail and the second seat rail encompassing one another and being movable relative to one another in a longitudinal direction and the first seat rail and the second seat rail being configured to be locked to one another via a locking device, the locking device having at least one locking element comprising at least one latching plate movable in a vertical direction;
      an additional locking means inoperative in a normal state and actuated only in an event of a crash by mass inertia.

11. A vehicle seat according to claim 10, wherein the additional locking means is configured to be operative both in event of a front impact and a rear impact.

12. A vehicle seat according to claim 10, wherein the additional locking means is configured to be independent of the locking device.

13. A vehicle seat according to claim 10, wherein the additional locking means is reversible.

14. A vehicle seat according to claim 10, wherein the additional locking means comprises a housing having a cross section which is substantially adapted in some portions to an inner face of the first seat rail.

15. A vehicle seat according to claim 14, wherein the housing comprises at least one through-opening, wherein the at least one through-opening is defined by an edge contour of the housing having a conical or dome-shaped path which opens toward an inner face of the housing.

16. A vehicle seat according to claim 14, wherein the additional locking means comprises a pivot lever pivotally mounted via a mounting portion in a mounting opening in the housing.

17. A vehicle seat according to claim 16, wherein an additional latching element is held at an end of the pivot lever, the end of the pivot lever being opposite the mounting portion.

18. A vehicle seat according to claim 10, wherein the additional locking means comprises a sphere arranged in the housing such that the sphere is freely movable in the housing.

* * * * *